Feb. 27, 1923.
F. T. HAGUE ET AL
1,447,163
COMMUTATING MEANS FOR DYNAMO-ELECTRIC MACHINES
Filed Mar. 9, 1918
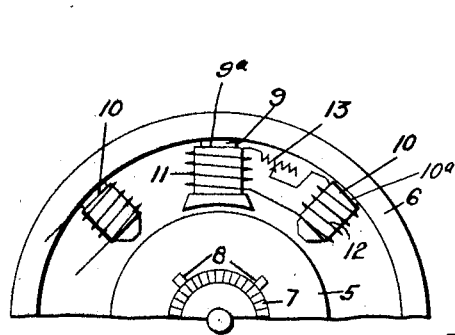
Fig. 1.
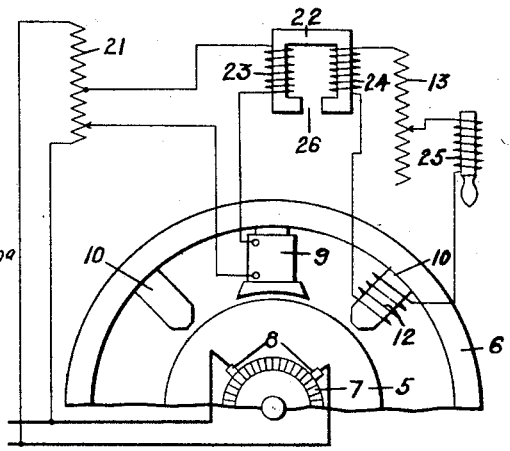
Fig. 2.
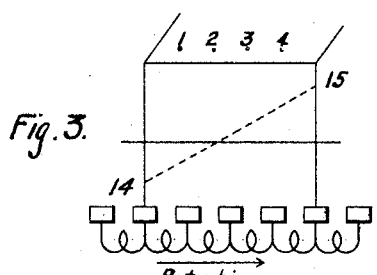
Fig. 3.
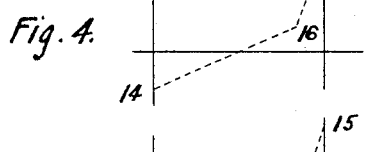
Fig. 4.
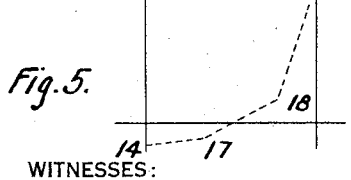
Fig. 5.
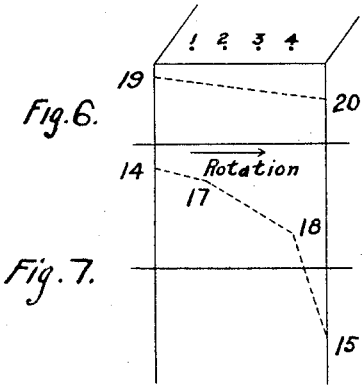
Fig. 6.
Fig. 7.
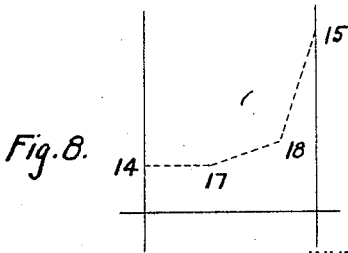
Fig. 8.
WITNESSES:
Ed. V. Herron
D. C. Davis
INVENTORS
Floyd T. Hague
Ollie Needham
BY
Wesley G. Carr
ATTORNEY Patented Feb. 27, 1923.

1,447,163

UNITED STATES PATENT OFFICE.

FLOYD T. HAGUE AND OLLIE NEEDHAM, OF PITTSBURGH, PENNSYLVANIA, ASSIGNORS TO WESTINGHOUSE ELECTRIC AND MANUFACTURING COMPANY, A CORPORATION OF PENNSYLVANIA.

COMMUTATING MEANS FOR DYNAMO-ELECTRIC MACHINES.

Application filed March 9, 1918. Serial No. 221,353.

*To all whom it may concern:*

Be it known that we, FLOYD T. HAGUE, a citizen of the United States, and a resident of Pittsburgh, in the county of Allegheny and State of Pennsylvania, and OLLIE NEEDHAM, a citizen of the United States, and a resident of Pittsburgh, in the county of Allegheny and State of Pennsylvania, have invented a new and useful Improvement in Commutating Means for Dynamo-Electric Machines, of which the following is a specification.

Our invention relates to dynamo-electric machines of the commutator type provided with commutating poles, and it has for its object to provide apparatus of the character specified with means whereby the harmful effects of abrupt changes in the exciting field strength upon the commutation may be minimized or entirely obviated.

In the accompanying drawing, Figs. 1 and 2 are simplified diagrammatic views of dynamo-electric machines, together with certain auxiliary elements, embodying preferred forms of our invention; and Figs. 3 to 8, inclusive, are diagrams in explanation of the difficulty to be overcome and of the means employed in the control thereof.

In a dynamo-electric machine of the commutator type provided with interpoles, the armature coil or coils undergoing commutation are disposed in inductive relation to the exciting field poles, so that abrupt changes in the exciting-field flux induce transformer electromotive forces therein which are liable to initiate sparking and flashovers. Thus, in reversing a rolling mill drive, where the exciting field of the generator is suddenly reversed in order to effect the reversal of the motor, the changes in the exciting field strength are extremely frequent and abrupt. By encircling both the exciting poles and the commutating poles by a common circuit and by disposing devices in said circuit to suitably affect the phase of currents flowing therein, a control of the field strength under the interpole may be effected, so as to cause the production of rotational electromotive forces in the short-circuited armature coils that shall be substantially equal and opposite to the transformer electromotive forces produced therein by alterations in the strength of the exciting field, thus obviating the above difficulty.

Referring to the drawing, we show a portion of a dynamo-electric machine in Fig. 1, said machine embodying an armature 5 and a field frame 6. The armature 5 is provided with a commutator cylinder 7 and with brushes 8—8 bearing thereupon. The frame 6 carries suitable exciting poles, one of which is shown at 9, together with suitable interpoles shown at 10—10. An auxiliary winding 11 overlies the ordinary exciting winding 9$^a$ of the exciting pole 9 and is connected in series relation with an auxiliary winding 12 surrounding the interpole 10, which is also provided with an exciting winding 10$^a$. An adjustable impedance device 13 may be inserted in circuit between these two auxiliary windings, if desired.

Having thus described the arrangement of the system of Fig. 1, the operation thereof is as follows. The armature coils undergoing commutation at the brushes 8—8 are in inductive relation to the exciting field pole 9, and, when the excitation of said pole is abruptly changed, as hitherto set forth, transformer electromotive forces are established in said armature coils and also in the auxiliary field winding 11. The connections of the winding 12 and the adjustment of the impedance device 13 are so arranged that the resultant flow of circulating currents in the auxiliary field winding 12 produces modification of the field under the pole 10, with resultant modification of the rotational electromotive force in the short-circuited armature coils undergoing commutation and compensation for said disturbing transformer electromotive forces in the short-circuited coils.

For a more detailed understanding of the electromotive forces in the coils in question, attention is directed to the diagrams of Figs. 3 to 8, inclusive. If the armature be assumed to be at rest and the exciting field strength be changed, the brush drop produced by the local currents flowing in those coils spanned by the brushes will be as indicated in Fig. 3, being plotted for four points in the brush face and lying in a straight line 14—15. Assuming the effect of armature rotation as superposed upon the effect thus discussed, it will be noted that the passage of each coil from under the brush interrupts the circuit of the local currents in that coil set up by said voltages and permits the establishment of a high self-inductive voltage therein, in accordance with Lenz's Law, so that the plotted voltage across the brush will be a broken line, as indicated at 14, 16, 15 in Fig. 4, the effect of said electromotive force being to enhance the transformer electromotive force induced in this coil by the changing exciting field.

In like manner, each coil, when entering the field, exhibits a voltage-absorbing effect as it builds up its inductive field, and this effect is opposed to the transformer effect just discussed, whereby the complete diagram of applied electromotive forces across the brush is indicated by a broken line 14—17—18—15 in Fig. 5.

The effect of the drops due to load current in a correctly adjusted machine under steady-load conditions are as plotted in Fig. 6, being a straight line 19—20 of opposite slope from the electromotive force line 14—15 of Fig. 3. The resultant brush drop produced by the combination of Figs. 5 and 6 is as shown in Fig. 7 for a decreasing main field and in Fig. 8 for an increasing main field, and the corrective effect of the coil 12 in Fig. 1 should be such as to provide proper compensation therefor. The function of the coil 12 is to set up a flux of such character that the armature coils will generate, by rotation, an equal and opposite electromotive force to that induced by the change of field flux, so that no resultant voltages to set up local currents will be left in the coils undergoing commutation.

An even more effective control of compensation may be effected by the apparatus shown in Fig. 2. A dynamo-electric machine has the energizing winding of its exciting pole 9 connected to a reversing rheostat 21, whereby the exciting field may be adjusted or reversed for the voltage control of a generator or for the speed control of a motor. An auxiliary transformer 22 is provided having a primary winding 23 in series circuit with the exciting winding 9 of the machine and having a secondary winding 24 in circuit with the auxiliary winding 12 of the interpole 10 through an adjustable resistor 13 and an adjustable reactor 25. The core of the transformer 22 may be provided with an air gap 26 in order to prevent saturation.

The operation of the system just described is similar to that previously set forth. Upon a change in the exciting field strength, brought about by the adjustment of the resistor 21, the energization of the winding 23 is modified, whereupon a change in electromotive force of the winding 24 is produced, changing the excitation of the auxiliary winding 12, the currents supplied to said winding being suitably modified by the reactor 25 to produce the desired rotational electromotive forces in the short-circuited armature coils.

It will be obvious to those skilled in the art that, by alteration of the relative numbers of turns in the windings 11 and 12, any desired corrective effect may be obtained. The winding 12 is most advantageously placed at the tip of the commutating pole where its effect upon the commutating field is most pronounced. The coils 11 may well encircle any portion of the exciting field-flux path. Thus they may be placed to encircle the frame rather than an exciting pole-piece. The windings 11 and 12 should be so proportioned that the winding 12 is unable to feed back through the coil 11 upon sudden load-changes, or, in other words, the winding 12 should not act as a damper with respect to the ordinary series excited commutating field flux.

We have described our arrangement particularly in combination with rolling-mill motors but it is susceptible of application in many other fields of service, as in railway motors and hoisting machines, wherein reversal of electromotive force or of direction of rotation or wherein transition from motor to generator operation is encountered.

While we have shown our invention in two of its preferred forms, it will be obvious to those skilled in the art that it is susceptible of still further modifications and changes without departing from the spirit thereof and we desire, therefore, that only such limitations shall be placed thereupon as are imposed by the prior art or are specifically set forth in the appended claims.

We claim as our invention:

1. A dynamo-electric machine comprising a frame, exciting and commutating poles carried thereby, exciting and commutating windings for the respective poles, an auxiliary winding for the commutating pole, and an auxiliary transformer means connected in series with the exciting winding of said exciting pole and with the auxiliary winding of said commutating pole.

2. A dynamo-electric machine comprising a frame, exciting and commutating poles carried thereby, exciting and commutating windings for the respective poles, an auxiliary winding for the commutating pole, an auxiliary transformer having the primary and the secondary windings thereof respectively connected in series with the exciting winding of said exciting pole and with the auxiliary winding of said commutating pole, and means for simultaneously controlling the excitation of said exciting and said auxiliary windings.

3. A dynamo-electric machine comprising a frame, exciting and commutating poles carried thereby, exciting and commutating windings for the respective poles, an auxiliary winding for the commutating pole, an auxiliary transformer having the primary and secondary windings thereof respectively connected in series with the exciting winding of said exciting pole and with the auxiliary winding of said commutating pole, means for adjusting the energization of the primary winding of said transformer and means for regulating the flow of current delivered to said auxiliary winding by the secondary winding of said transformer.

In testimony whereof, we have hereunto subscribed our names this 28th day of Feb., 1918.

FLOYD T. HAGUE.
OLLIE NEEDHAM.